(12) United States Patent
Ogasahara

(10) Patent No.: US 8,982,225 B2
(45) Date of Patent: Mar. 17, 2015

(54) CAMERA MODULE, IMAGE PROCESSING APPARATUS, AND IMAGE PROCESSING METHOD

(75) Inventor: Takayuki Ogasahara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 576 days.

(21) Appl. No.: 13/361,304

(22) Filed: Jan. 30, 2012

(65) Prior Publication Data

US 2012/0236186 A1 Sep. 20, 2012

(30) Foreign Application Priority Data

Mar. 18, 2011 (JP) ................................. 2011-060155

(51) Int. Cl.
*H04N 5/225* (2006.01)
*G06K 9/32* (2006.01)

(52) U.S. Cl.
CPC .................................. *H04N 5/2258* (2013.01)
USPC .......... 348/218.1; 348/340; 348/343; 382/294

(58) Field of Classification Search
USPC ................. 348/207.99, 208.99, 208.1, 208.2, 348/208.3, 208.4, 208.5, 208.6, 208.12, 348/208.13, 222.1, 231.2, 231.3, 234, 239, 348/290, 291, 345, 346, 3, 47, 348, 349, 348/350, 351, 352, 353, 354, 355, 356, 348/218.1, 347, 34, 9, 340, 343; 382/232, 382/254, 255, 263, 264, 266, 275, 294
See application file for complete search history.

(56) References Cited

U.S. PATENT DOCUMENTS

| 8,049,786 B2* | 11/2011 | Pan et al. ................... 348/218.1 |
| 8,724,000 B2* | 5/2014 | Georgiev et al. .............. 348/307 |
| 2005/0196068 A1* | 9/2005 | Kawai ........................... 382/276 |
| 2011/0228142 A1* | 9/2011 | Brueckner et al. ............ 348/241 |
| 2013/0127901 A1* | 5/2013 | Georgiev et al. .............. 345/620 |

FOREIGN PATENT DOCUMENTS

JP 2005-197379 7/2005

OTHER PUBLICATIONS

U.S. Appl. No. 13/221,061, filed Aug. 30, 2011, Risako Ueno, et al.
Ren NG, et al. "Light Field Photography with a Hand-held Plenoptic Camera", Stanford Tech Report CTSR Feb. 2005, 11 pages.
U.S. Appl. No. 13/771,559, filed Feb. 20, 2013, Ogasahara, et al.

* cited by examiner

*Primary Examiner* — Lin Ye
*Assistant Examiner* — Peter Chon
(74) *Attorney, Agent, or Firm* — Oblon, McClelland, Maier & Neustadt, L.L.P.

(57) ABSTRACT

According to one embodiment, a camera module includes a second imaging optical system and an image processing section. The second imaging optical system forms an image piece. The image processing section has at least one of an alignment adjustment section, a resolution restoration section, and a shading correction section and has a stitching section. The stitching section joins the image pieces, subjected to at least one of alignment adjustment, resolution restoration, and shading correction, together to form a subject image.

6 Claims, 7 Drawing Sheets

CAMERA MODULE, IMAGE PROCESSING APPARATUS, AND IMAGE PROCESSING METHOD

CROSS-REFERENCE TO RELATED APPLICATIONS

This application is based upon and claims the benefit of priority from Japanese Patent Application No. 2011-060155, filed on Mar. 18, 2011; the entire contents of which are incorporated herein by reference.

FIELD

Embodiments described herein relate generally to a camera module, an image processing apparatus, and an image processing method.

BACKGROUND

Recently, there has been proposed a camera module having a compound-eye configuration that can simultaneously photograph a subject from a plurality of viewpoints. In the camera module, by image processing of an image group photographed using the compound-eye configuration, a subject distance can be estimated, and a two-dimensional image can be reconstructed by joining images together, and the like. In the camera module, the depth information of a subject can be obtained from a plurality of images from different viewpoints. The camera module performs image processing such as refocusing by utilizing the depth information.

As the compound-eye configuration of the camera module, there has been known, for example, one in which a sub-lens array is provided between an image sensor and a main lens through which light from a subject is taken into an image sensor. The diameter of a sub lens constituting the sub-lens array is so small as approximately 140 μm, for example, and a distance between the sub-lens array and the image sensor is so short as approximately 350 μm, for example. Consequently, a manufacturing error and an installation error of the sub lens, the optical performance of the sub lens, and so on significantly affect the image quality. Thus, to obtain a high-quality image, the problems include reduction in yield of the camera module and increase in a manufacturing cost used for suppressing the manufacturing error and the installation error of the sub lens.

DETAILED DESCRIPTION

In general, according to one embodiment, a camera module includes an imaging section, a first imaging optical system, a second imaging optical system, and an image processing section. The imaging section comprises pixel cells arranged in the form of an array. The imaging section images a subject image. The first imaging optical system comprises a main lens. The main lens takes light from a subject into the imaging section. The second imaging optical system is provided in an optical path between the imaging section and the first imaging optical system. The second imaging optical system forms an image piece. The image piece corresponds to a portion of the subject image. The second imaging optical system forms the image piece for each pixel block. The pixel block is constituted of a plurality of pixel cells. The image processing section performs a signal processing of an image signal. The image signal is obtained by imaging the subject image in the imaging section. The second imaging optical system forms the image piece by a sub lens. The sub lens is provided corresponding to each of the pixel blocks. The image processing section has at least one of an alignment adjustment section, a resolution restoration section, and a shading correction section and has a stitching section. The alignment adjustment section performs alignment adjustment for correcting a deviation in an image piece due to an individual difference of the sub lens. The resolution restoration section performs resolution restoration of the image piece based on lens characteristics of the sub lens. The shading correction section performs shading correction in the sub lens. The stitching section joins the image pieces, subjected to at least one of the alignment adjustment, the resolution restoration, and the shading correction, together to form the subject image.

Exemplary embodiments of a camera module, an image processing apparatus, and an image processing method will be explained below in detail with reference to the accompanying drawings. The present invention is not limited to the following embodiments.

Figure 1:
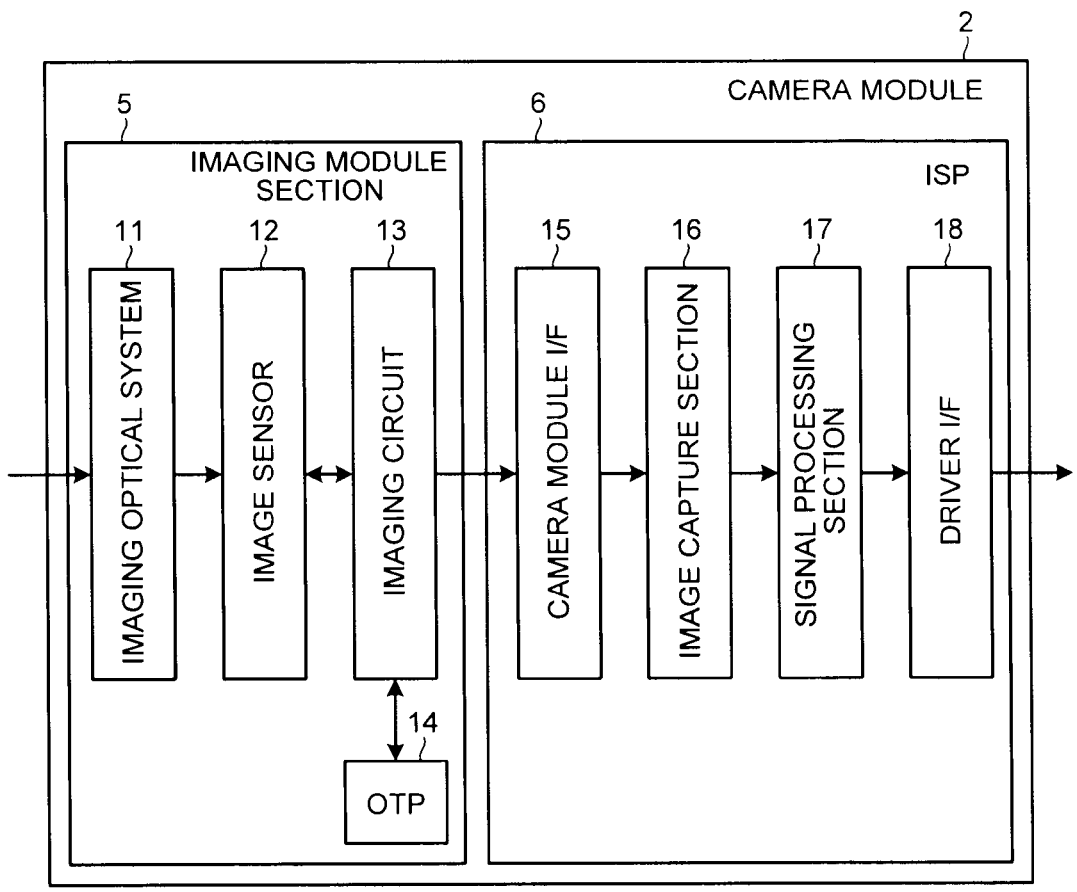
FIG. 1 is a block diagram illustrating a schematic configuration of a camera module according to an embodiment.
Figure 2:
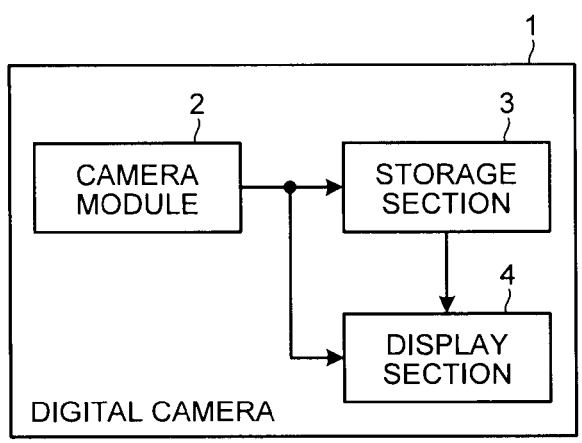
FIG. 2 is a block diagram illustrating a configuration of a digital camera which is electronic equipment comprising the camera module illustrated in FIG. 1.

FIG. 1 is a block diagram illustrating a schematic configuration of a camera module according to the embodiment. FIG. 2 is a block diagram illustrating a configuration of a digital camera which is electronic equipment comprising the camera module illustrated in FIG. 1.

A digital camera 1 has a camera module 2, a storage section 3, and a display section 4. The camera module 2 images a subject image. The storage section 3 stores an image taken by the camera module 2. The display section 4 displays the image taken by the camera module 2. The display section 4 is a liquid crystal display, for example.

The camera module 2 outputs an image signal to the storage section 3 and the display section 4 by imaging the subject image. The storage section 3 outputs the image signal to the display section 4 in response to user's operation and so on. The display section 4 displays an image in response to the image signal input from the camera module 2 or the storage section 3. An electronic equipment to which the camera module 2 is applied may be a equipment other than the digital camera 1, such as a camera-equipped portable terminal.

The camera module 2 has an imaging module section 5 and an image signal processor (ISP) 6. The imaging module section 5 has an imaging optical system 11, an image sensor 12, an imaging circuit 13, and an OTP (one time programmable memory) 14. The imaging optical system 11 takes light from a subject into the image sensor 12, and a subject image is formed by the image sensor 12. The image sensor 12 converts the light taken by the imaging optical system 11 into a signal charge. The image sensor 12 functions as an imaging section imaging the subject image.

The imaging circuit 13 drives the image sensor 12 and processes the image signal from the image sensor 12. The imaging circuit 13 takes thereinto signal values of R (red), G (green), and B (blue) in order corresponding to a Bayer array and thereby generates an analog image signal. The imaging circuit 13 converts an obtained image signal from an analog mode into a digital mode. The OTP 14 stores a parameter used for signal processing of the image signal.

An ISP 6 has a camera module I/F (interface) 15, an image capture section 16, a signal processing section 17, and a driver I/F (interface) 18. A RAW image obtained by imaging in the imaging module section 5 is captured from the camera module I/F 15 by the image capture section 16.

The signal processing section 17 applies the signal processing to the RAW image captured by the image capture section 16. The driver I/F 18 outputs the image signal subjected to the signal processing by the signal processing section 17 to a display driver (not illustrated). The display driver displays the image imaged by the camera module 2.

Figure 3:
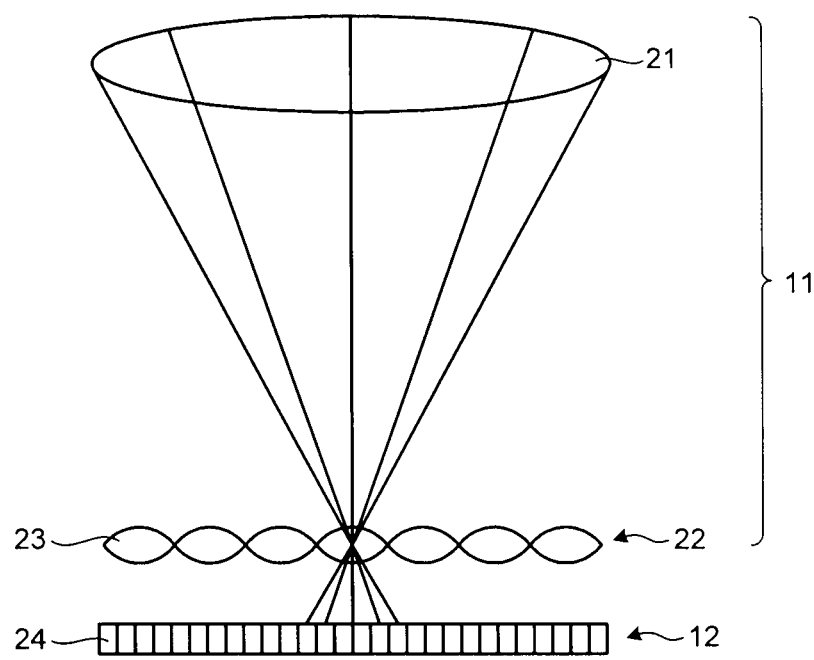
FIG. 3 is a cross-sectional schematic diagram of an imaging optical system and an image sensor.
Figure 4:
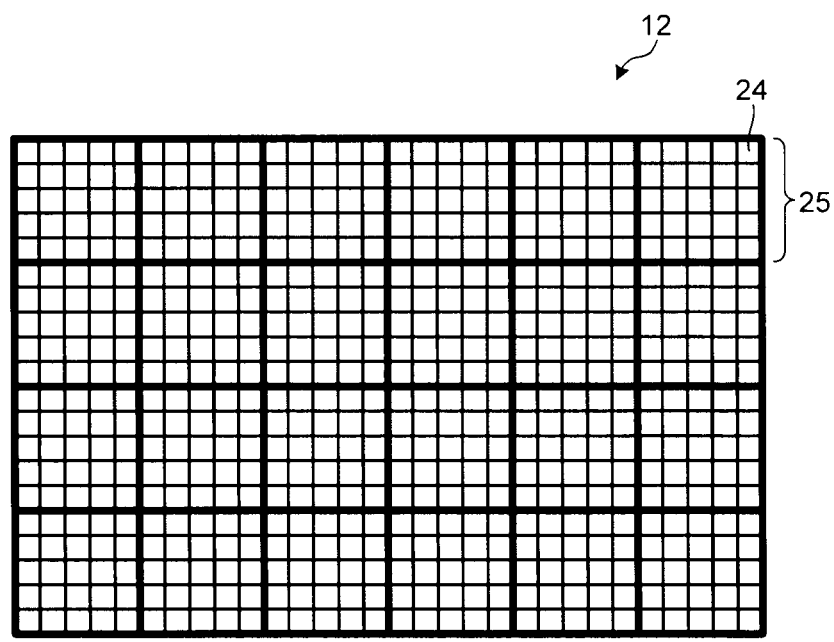
FIG. 4 is a schematic diagram of a light-incident-side flat surface of the image sensor.

FIG. 3 is a cross-sectional schematic diagram of an imaging optical system and an image sensor. FIG. 4 is a schematic diagram of a light-incident-side flat surface of the image sensor. The image sensor 12 comprises pixel cells 24 arranged in the form of an array. In the image sensor 12, pixel blocks 25 constituted of a plurality of pixel cells 24 are set. The pixel block 25 is constituted of 25 pixel cells 24 arranged in the form of an array of 5 by 5 in rows and columns, for example.

The imaging optical system 11 has a main lens 21 and a sub-lens array 22. The main lens 21 functions as a first imaging optical system taking light from a subject into the image sensor 12. The sub-lens array 22 is provided in an optical path between the image sensor 12 and the main lens 21, such as an imaging plane of the main lens 12.

The sub-lens array 22 comprises sub lenses 23 arranged in the form of an array. The sub lenses 23 are provided corresponding to each of the pixel blocks 25. Each of the sub lenses 23 forms as an image piece the subject image formed by the main lens 21. The image piece corresponds to a portion of the subject image. The sub-lens array 22 forms the image piece for each pixel block. The arrangement of the sub lenses 23 may be either a square lattice arrangement or a hexagonal close-packed arrangement.

In the camera module 2, light entering the imaging optical system 11 from the subject is divided by a plurality of the sub lenses 23, and the image pieces as the same number as the sub lenses 23 are created in the image sensor 12. The image sensor 12 generates a parallax according to the arrangement position of the sub lenses 23 and thereby creates the image pieces having information from different viewpoints.

Figure 5:
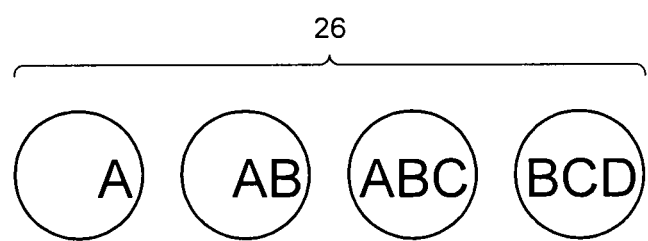
FIG. 5 is an explanatory view of an image piece created by the image sensor.
Figure 6:
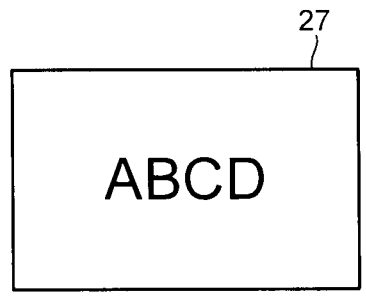
FIG. 6 is an explanatory view of a reconstruction processing of a subject image by the camera module.

FIG. 5 is an explanatory view of the image piece created by the image sensor. FIG. 6 is an explanatory view of a reconstruction processing of the subject image by the camera module. In this example, a character string "ABCD" is imaged by the camera module 2, and the reconstruction processing is performed.

A field of view formed by each of the sub lenses 23 as the image piece 26 has an overlap range corresponding to the parallax in the imaging plane of the main lens 21. As illustrated in FIG. 5, for example, the character string "ABCD" is formed by the image sensor 12 so as to become the image pieces 26 whose overlapping portions are slightly different from each other. Then, the camera module 2 joins the image pieces 26 together so that the overlapping portions are coincided and thereby reconstructs the subject image. The image pieces 26 illustrated in FIG. 5 is reconstructed to a subject image 27 including the character string "ABCD" as illustrated in FIG. 6 by such a signal processing that the characters "A", "B", "C", and "D" are coincided with each other.

Figure 7:
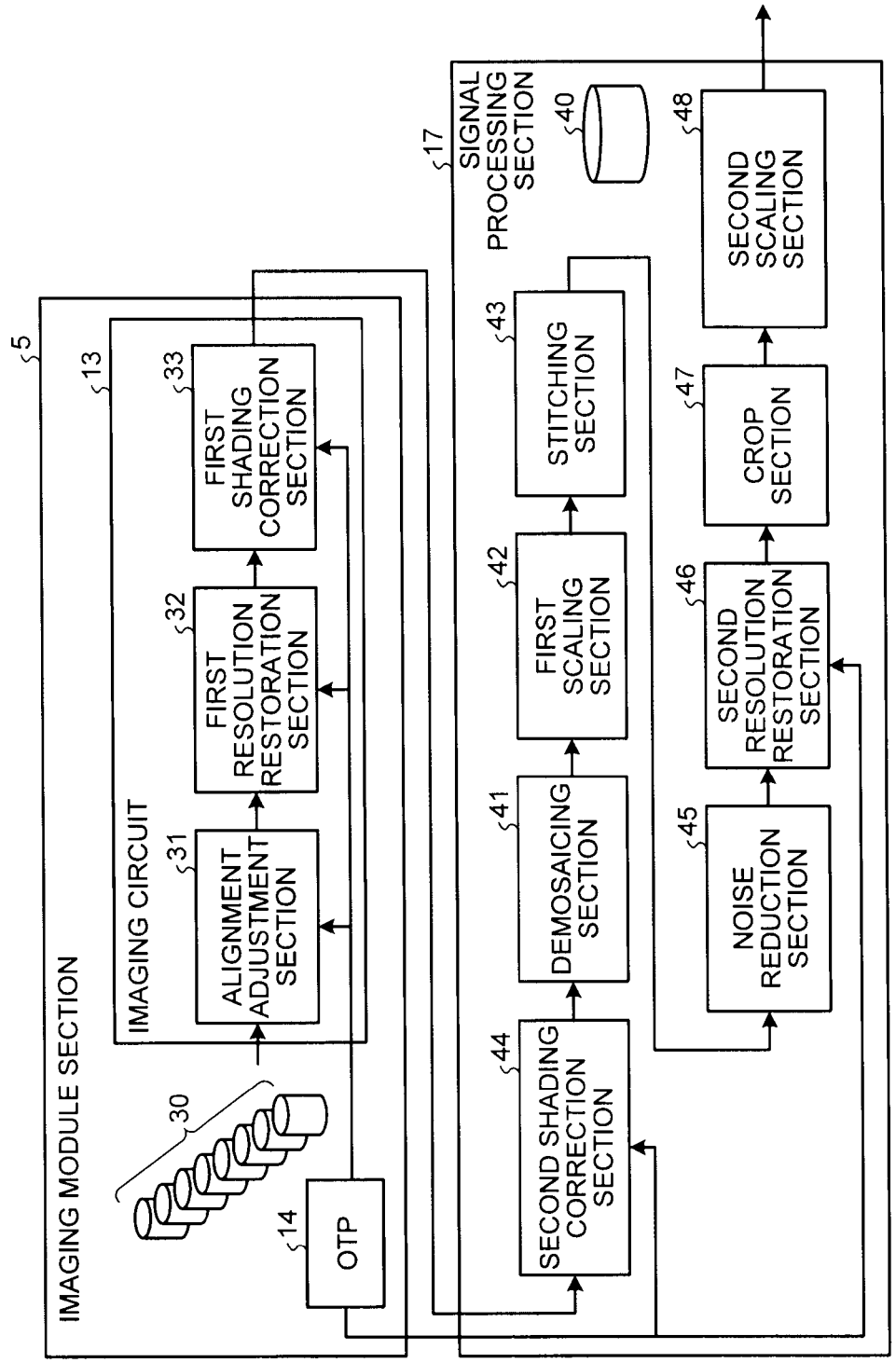
FIG. 7 is a block diagram illustrating a constitution for image processing in the camera module.

FIG. 7 is a block diagram illustrating a constitution for the image processing in the camera module. The signal processing in the camera module 2 is roughly divided into the processing in the imaging module section 5 and the processing in the ISP 6. The imaging circuit 13 of the imaging module section 5 and the signal processing section 17 of the ISP 6 function as an image processing section (image processing apparatus) performing the signal processing of the image signal obtained by imaging the subject image in the image sensor 12.

The imaging circuit 13 has an alignment adjustment section 31, a first resolution restoration section 32, and a first shading correction section 33. The alignment adjustment section 31, the first resolution restoration section 32, and the first shading correction section 33 apply the signal processing to a RAW image 30 as a plurality of the image pieces 26 obtained by imaging in the image sensor 12.

The alignment adjustment section 31 performs the alignment adjustment of the image pieces 26 for correcting the deviation of the image pieces 26 due to the individual difference of the sub lens 23. The individual difference of the sub lens 23 is a difference occurring for each of the sub lenses 23, such as the manufacturing error and the installation error of the sub lens 23. The alignment adjustment section 31 performs coordinate transformation of the image pieces 26, using an alignment adjustment correction coefficient previously stored in the OTP 14.

The first resolution restoration section 32 performs resolution restoration for each of the image pieces 26 based on the lens characteristics of the sub lens 23 (first resolution restoration). As the lens characteristics, a point spread function (PSF) is used, for example. The first resolution restoration section 32 multiplies the deconvolution matrix of the PSF, for example, and thereby restores an image with reduced blur. The deconvolution matrix of the PSF is previously stored in the OTP 14. The effect of the resolution restoration depends on algorithm used in the restoration. The first resolution restoration section 32 uses the Richardson-Lucy method, for example, in order to restore an image close to an original subject image.

The first shading correction section 33 performs the shading correction for correcting an illuminance unevenness caused by the sub lens 23, and particularly a light quantity difference between a central portion of the image piece 26 and a peripheral portion thereof (first shading correction). The first shading correction section 33 performs the shading correction of the image piece 26, using a shading correction coefficient previously stored in the OTP 14.

The signal processing section 17 has a second shading correction section 44, a demosaicing section 41, a first scaling section 42, a stitching section 43, a noise reduction section 45, a second resolution restoration section 46, a crop section 47, and a second scaling section 48.

The second shading correction section 44 performs the shading correction for correcting the illuminance unevenness caused by the main lens 21, and particularly the light quantity difference between a central portion of the subject image and a peripheral portion thereof (second shading correction). The second shading correction section 44 performs the shading correction of the RAW image 30 subjected to the alignment adjustment, the resolution restoration, and the shading correction in the imaging circuit 13. The second shading correction section 44 uses the shading correction coefficient previously stored in the OTP 14.

The demosaicing section 41 synthesizes a color bit map image by a demosaicing processing of the RAW image 30 subjected to the shading correction in the second shading correction section 44. The first scaling section 42 performs a scaling processing of the image piece 26. The stitching section 43 joins the image pieces 26 together to form a bit map image 40 as a subject image. The noise reduction section 45 removes noise of the subject image.

The second resolution restoration section 46 performs the resolution restoration of the bit map image 40 as the subject image based on the lens characteristics of the main lens 21 and the lens characteristics of the sub lens 23 (second resolution restoration). As with the first resolution restoration section 32, the second resolution restoration section 46 uses the deconvolution matrix of the PSF previously stored in the OTP 14. Further, as with the first resolution restoration section 32, the second resolution restoration section 46 uses the Richardson-Lucy method, for example.

The crop section 47 performs a crop processing of cutting a portion of the subject image. The second scaling section 48 performs a scaling processing of the subject image. The procedure of the processing described in the present embodiment is an example, and the addition of other processing, skip of processing that can be omitted, and a change of the processing order may be suitably performed. The signal processing by each component may be performed by either the imaging circuit 13 or the signal processing section 17 or may be performed to be shared by both of them. For example, the alignment adjustment section 31, the first resolution restoration section 32, and the first shading correction section 33 may be provided in the signal processing section 17.

Figure 8:
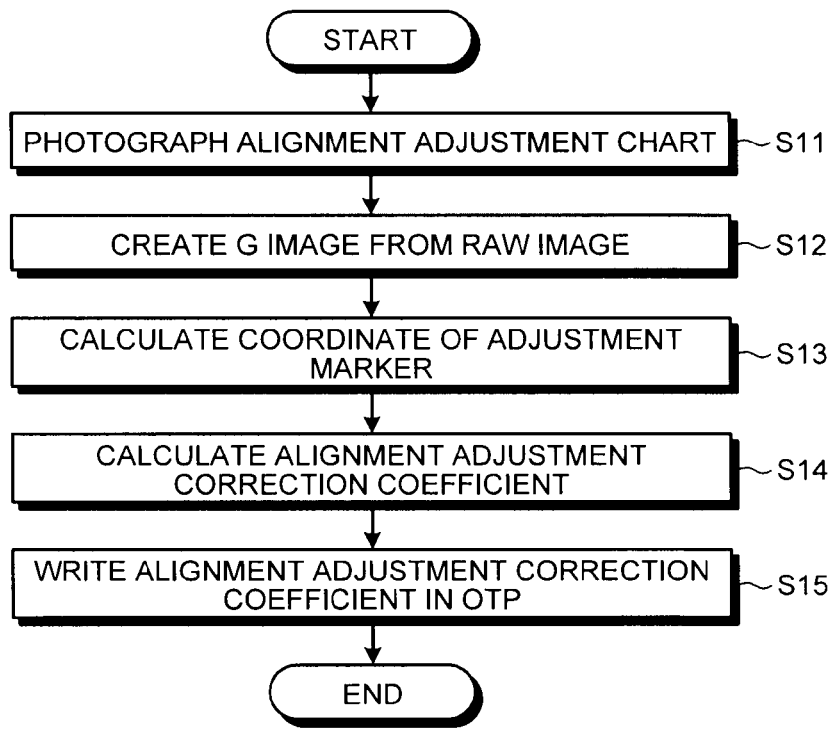
FIG. 8 is a flow chart illustrating a procedure of setting an alignment adjustment correction coefficient for alignment adjustment in an alignment adjustment section.

FIG. 8 is a flow chart illustrating a procedure of setting the alignment adjustment correction coefficient for the alignment adjustment in the alignment adjustment section. The alignment adjustment correction coefficient is set in the manufacturing process of the camera module 2, for example. In step S11, a chart for alignment adjustment is arranged, and the alignment adjustment chart is taken by the camera module 2.

Figure 9:
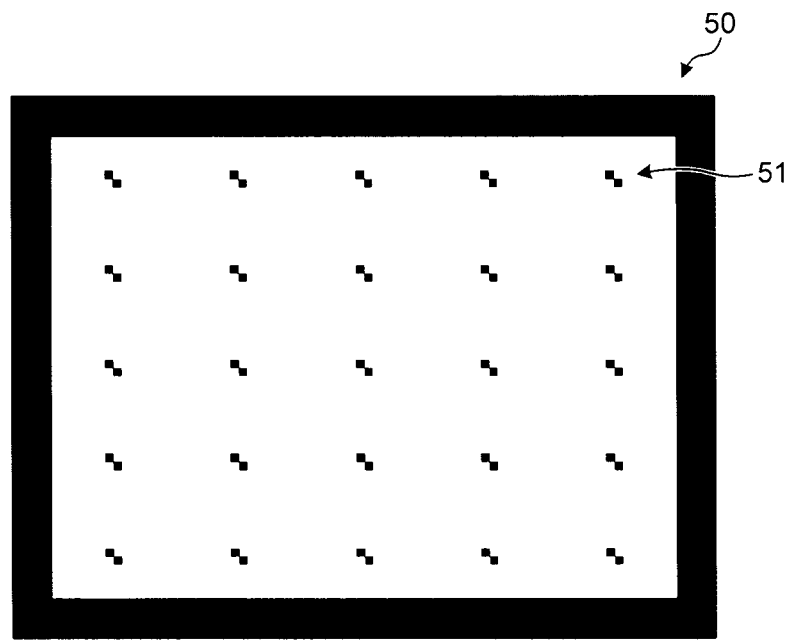
FIG. 9 is a view illustrating an example of an alignment adjustment chart.

FIG. 9 is a view illustrating an example of the alignment adjustment chart. A plurality of adjustment markers 51 are described in an alignment adjustment chart 50. The adjustment markers 51 are arranged in the form of a matrix of five in the longitudinal direction and five in the lateral direction. The number of the adjustment markers 51 in the alignment adjustment chart 50 may be suitably changed.

The adjustment marker 51 is a mark formed by connecting corners of two black squares with each other, and the position at which the corners are connected with each other is the coordinate of the adjustment marker 51. The adjustment marker 51 may have any shape as long as it can specify the position on the alignment adjustment chart 50. The arrangement of the adjustment markers 51 may be suitably changed. For example, when there is a range in which high-definition photographing is especially desired, a large number of the adjustment markers 51 may be arranged in the range.

In step S12, the obtained image pieces 26 are made to be a single subject image in the stitching section 43, and an image constituted of a signal of G among R, G, and B (suitably referred to as a "G image") is generated. In the image sensor 12, with regard to a pixel for R and a pixel for B, a signal value of a surrounding pixel for G is interpolated, whereby a signal value of G is generated. In the case of photographing at a low illuminance, or in the case where the sensitivity of the image sensor 12 is low, a G image may be generated after the noise reduction.

In step S13, each coordinate of the adjustment markers 51 is calculated from the G image generated in step S12. In step S14, the alignment adjustment correction coefficient is calculated from the coordinate of the adjustment marker 51 calculated in step S13. In step S15, the alignment adjustment correction coefficient calculated in step S14 is written in the OTP 14.

The alignment adjustment correction coefficient is a coefficient in matrix operation. The alignment adjustment correction coefficient is obtained by the following formulae, using a least-squares method, for example:

$$Y = kX$$

$$K = YX^t[XX^t]^{-1},$$

wherein k is the alignment adjustment correction coefficient, Y is the coordinate of the adjustment marker 51 calculated in step S13, and X is a coordinate previously set as standard. $X^t$ is a transposed matrix of X. $[XX^t]^{-1}$ is an inverse matrix of $XX^t$. Although the alignment adjustment correction coefficient is obtained by the least-squares method, it may be obtained using other algorithm such as a nonlinear optimization method.

The alignment adjustment section 31 reads the alignment adjustment correction coefficient from the OTP 14 for each photographing by the camera module 2. Further, the alignment adjustment section 31 applies coordinate conversion using the alignment adjustment correction coefficient read from the OTP 14 to the RAW image 30 obtained by the image sensor 12.

The alignment adjustment section 31 performs the coordinate conversion by calculation using the following formula, for example. $k_{ij}$ is the alignment adjustment correction coefficient, (x, y) is a coordinate before correction, and (x', y') is a coordinate after the correction.

$$\begin{bmatrix} x' \\ y' \\ 1 \end{bmatrix} = \begin{bmatrix} k_{11} & k_{12} & k_{13} \\ k_{21} & k_{22} & k_{23} \\ 0 & 0 & 1 \end{bmatrix} \cdot \begin{bmatrix} x \\ y \\ 1 \end{bmatrix}$$

The camera module 2 can suppress the deviation in the image piece 26 due to the manufacturing error and the installation error of the sub lens 23 by the coordinate conversion in the alignment adjustment section 31. Although the alignment adjustment section 31 performs the coordinate conversion collectively by the matrix operation, the coordinate conversion may be performed portion by portion by the calculation using the alignment adjustment correction coefficient suitably changed according to an image height. When a vertical axis perpendicular to an optical axis of a lens is assumed, the image height is a distance along the vertical axis from an intersection between the vertical axis and the optical axis.

The alignment adjustment section 31 may perform the coordinate conversion by referring to a lookup table, for example, instead of the matrix operation. The alignment adjustment correction coefficient may not be calculated after the generation of the G image from the RAW image. The alignment adjustment correction coefficient may be calculated based on the G image extracted from the color bit map image, for example.

Figure 10:
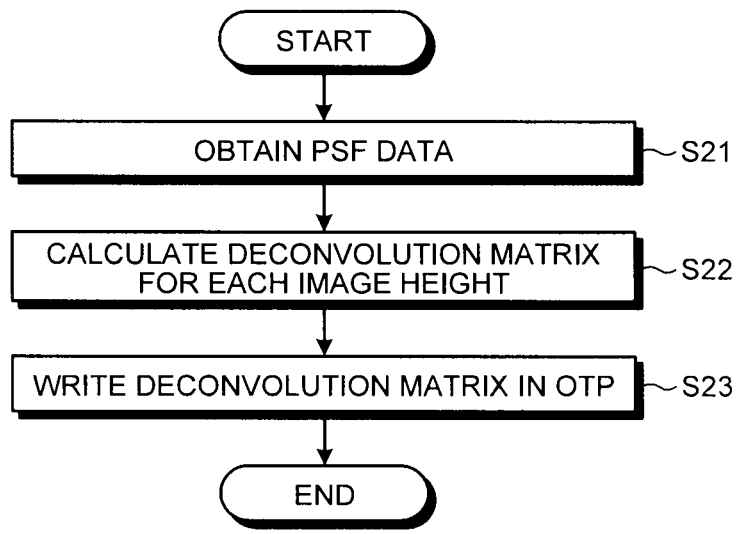
FIG. 10 is a flow chart illustrating a procedure of setting a deconvolution matrix for resolution restoration in a first resolution restoration section and a second resolution restoration section.

FIG. 10 is a flow chart illustrating a procedure of setting the deconvolution matrix for the resolution restoration in the first resolution restoration section and the second resolution restoration. The deconvolution matrix may be set in the manufacturing process of the camera module 2, for example. In step S21, a test chart is taken by the camera module 2, and photographing data obtained by photographing is calculated, whereby PSF data is obtained. The PSF data is obtained by, for example, presuming a standard image free from blur and measuring the level of blur of an observation image relative to the standard image. In the test chart, the imaging plane of the image sensor 12 is virtually divided into nine areas of three rows by three columns, for example, and the test chart is a point image chart constituted of a plurality of point images.

In step S22, the deconvolution matrix for each image height is calculated based on the PSF data obtained in step S21. The deconvolution matrix with respect to the subject image reconstructed from the image pieces 26 and the deconvolution matrix with respect to each of the image pieces 26 are calculated. The deconvolution matrix with respect to the image piece 26 reflects the PSF data for each image height of the sub lens 23. The deconvolution matrix with respect to the subject image reflects the PSF data for each image height of the main lens 21 and the PSF data grouped for each of the sub lenses 23. In step S23, the deconvolution matrix calculated in step S22 is written in the OTP 14.

The first resolution restoration section 32 reads the deconvolution matrix with respect to the image piece 26 from the OTP 14 for each taking by the camera module 2. The first resolution restoration section 32 multiplies the deconvolution matrix for each image height of the sub lens 23 by the RAW data of the image piece 26.

The second resolution restoration section 46 reads the deconvolution matrix with respect to the subject image from the OTP 14 for each taking by the camera module 2. Further, the second resolution restoration section 46 multiplies the deconvolution matrix for each image height of the main lens 21 and the deconvolution matrix for each of the sub lenses 23 by the bit map data of the subject image.

The resolution restoration method by multiplying the deconvolution matrix is based on such a theory that the observation image can be expressed by a real image and convolution of a PSF function causing deterioration of an image. In the camera module 2, by virtue of the multiplication of the deconvolution matrix in the first resolution restoration section 32, the blur for each of the image pieces 26 due to the lens characteristics of the sub lens 23 can be suppressed.

In the camera module 2, by virtue of the multiplication of the deconvolution matrix in the second resolution restoration section 46, the blur of the subject image due to the lens characteristics of the main lens 21 and the lens characteristics of the sub lens 23 can be suppressed. At least one of the first resolution restoration section 32 and the second resolution restoration section 46 may perform the data conversion by referring to the lookup table, for example, instead of the matrix operation.

Figure 11:
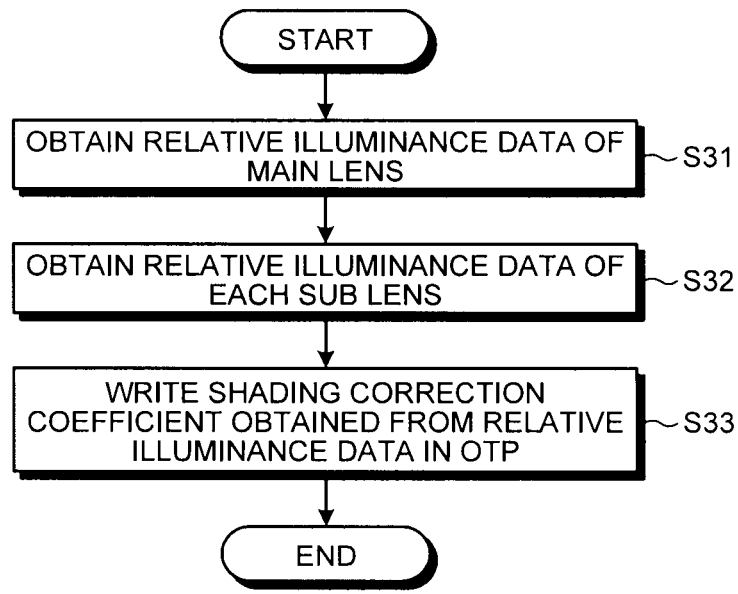
FIG. 11 is a flow chart illustrating a procedure of setting a shading correction coefficient for shading correction in a first shading correction section and a second shading correction section.

FIG. 11 is a flow chart illustrating a procedure of setting the shading correction coefficient for the shading correction in the first shading correction section and the second shading correction section. The shading correction coefficient is set in the manufacturing process of the camera module 2, for example. In step S31, relative illuminance data of the main lens 21 is obtained. In step S32, relative illuminance data of each of the sub lenses 23 is obtained. The order of step S31 and step S32 is arbitrary.

Figure 12:
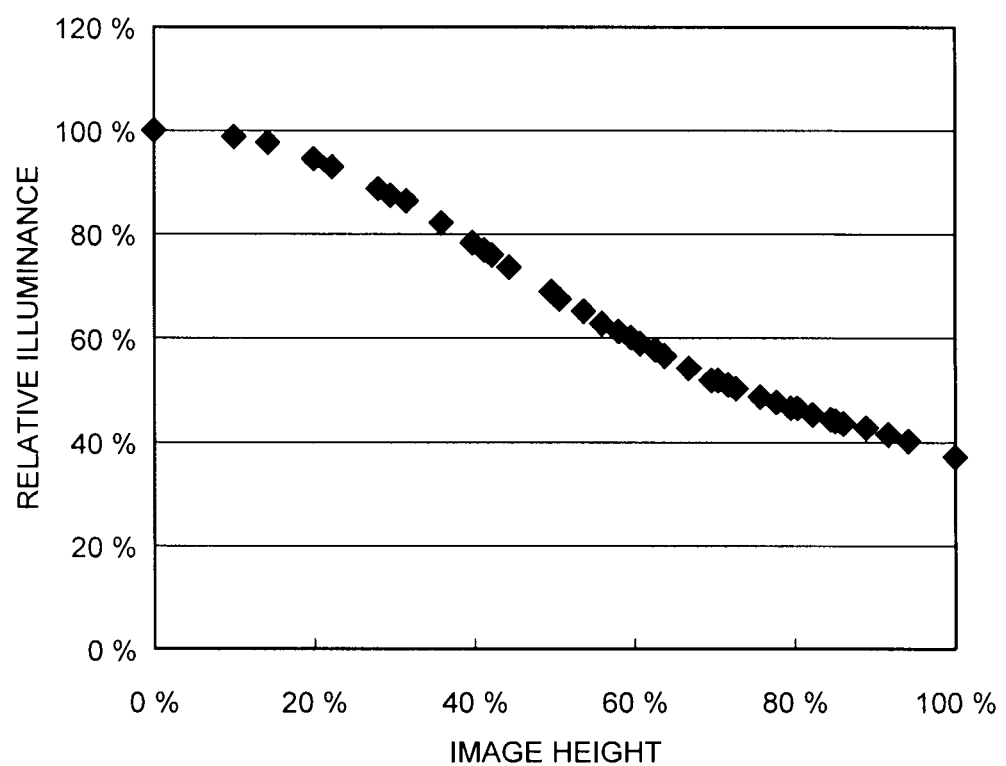
FIG. 12 is a view illustrating an example of relative illuminance data obtained for each lens.

FIG. 12 is a view illustrating an example of the relative illuminance data obtained for each lens. The relative illuminance data is the relative illuminance for each image height. The relative illuminance is a relative illuminance in a case where the illuminance at the image height of zero is 100%. Usually, the relative illuminance of a lens is reduced as the image height is increased.

In step S33, the shading correction coefficient in the main lens 21 and the shading correction coefficient in the sub lens 23 are obtained to be written in the OTP 14. As the shading correction coefficient in the main lens 21, such a coefficient that offsets an illuminance difference for each image height of the subject image is set based on the relative illuminance data obtained in step S31. As the shading correction coefficient in the sub lens 23, such a coefficient that offsets the illuminance difference for each image height of the image piece 26 is set for each of the sub lenses 23 based on the relative illuminance data obtained in step S32.

The first shading correction section 33 reads the shading correction coefficient in each of the sub lenses 23 from the OTP 14 for each taking by the camera module 2. Further, the first shading correction section 33 multiplies the RAW data of each of the image pieces 26 by the shading correction coefficient of the sub lens 23 corresponding to each of them.

The second shading correction section 44 reads the shading correction coefficient in the main lens 21 from the OTP 14 for each taking by the camera module 2. Further, the second shading correction section 44 multiplies the bit map data of the subject image by the shading correction coefficient in the main lens 21.

By virtue of the multiplication of the shading correction coefficient in the first shading correction section 33, the camera module 2 can suppress the illuminance unevenness of each of the image pieces 26 caused by the sub lens 23. Further, by virtue of the multiplication of the shading correction coefficient in the second shading correction section 44, the camera module 2 can suppress the illuminance unevenness of the subject image caused by the main lens 21.

At least one of the first shading correction section 33 and the second shading correction section 44 may perform the data conversion by referring to the lookup table, for example, instead of the multiplication of the shading correction coefficient.

The camera module 2 comprises the alignment adjustment section 31, the first resolution restoration section 32, and the first shading correction section 33, whereby the influences of the manufacturing error and the installation error of the sub lens 23, the optical performance of the sub lens 23, and so on the image quality are suppressed. Consequently, in the camera module 2, a high-quality image can be obtained using a compound-eye configuration that can simultaneously photograph the same subject from a plurality of viewpoints.

The camera module 2 may not comprise all of the alignment adjustment section 31, the first resolution restoration section 32, and the first shading correction section 33. The camera module 2 may comprise at least one of the alignment adjustment section 31, the first resolution restoration section 32, and the first shading correction section 33. Consequently, the camera module 2 can suppress at least one of the influences such as the individual difference of the sub lens 23 and the optical performance thereof, and a good image quality can be obtained.

The camera module according to the embodiment may be applied to electronic equipment other than a digital camera, such as a camera-equipped cell-phone.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A camera module comprising:
    an imaging section which comprises pixel cells arranged in a form of an array and images a subject image;
    a first imaging optical system which comprises a main lens through which light from a subject is taken into the imaging section;
    a second imaging optical system which is provided in an optical path between the imaging section and the first imaging optical system and forms an image piece, corresponding to a portion of the subject image, for each pixel block constituted of a plurality of the pixel cells; and
    an image processing section which performs a signal processing of an image signal obtained by imaging the subject image in the imaging section,
    wherein the second imaging optical system forms the image piece by a sub-lens provided corresponding to each of the pixel blocks, and
    the image processing section includes
        a first shading correction section performing shading correction for correcting an illuminance unevenness caused by the sub-lens;
        a stitching section which joins the image pieces, subjected to the shading correction by the first shading correction section, together to form the subject image; and
        a second shading correction section performing shading correction of the subject image formed by joining the image pieces together in the stitching section for correcting an illuminance unevenness caused by the main lens.

2. The camera module according to claim 1, wherein the image processing section further includes at least one of:
    an alignment adjustment section performing alignment adjustment for correcting a deviation in the image piece due to an individual difference of the sub-lens; and
    a resolution restoration section performing resolution restoration of the image piece based on lens characteristics of the sub-lens, and
    the stitching section joins the image pieces, subjected to at least one of the alignment adjustment and the resolution restoration, together to form the subject image.

3. A camera module comprising:
    an imaging section which comprises pixel cells arranged in a form of an array and images a subject image;
    a first imaging optical system which comprises a main lens through which light from a subject is taken into the imaging section;
    a second imaging optical system which is provided in an optical path between the imaging section and the first imaging optical system and forms an image piece, corresponding to a portion of the subject image, for each pixel block constituted of a plurality of the pixel cells; and
    an image processing section which performs a signal processing of an image signal obtained by imaging the subject image in the imaging section,
    wherein the second imaging optical system forms the image piece by a sub-lens provided corresponding to each of the pixel blocks, and
    the image processing section includes
        a first resolution restoration section performing resolution restoration of the image piece based on lens characteristics of the sub-lens;
        a stitching section which joins the image pieces, subjected to the resolution restoration by the first resolution restoration section, together to form the subject image; and
        a second resolution restoration section performing resolution restoration of the subject image formed by joining the image pieces together in the stitching section based on lens characteristics of the main lens and the lens characteristics of the sub lens.

4. The camera module according to claim 3, wherein the image processing section further includes at least one of:
    an alignment adjustment section performing alignment adjustment for correcting a deviation in the image piece due to an individual difference of the sub-lens; and
    a shading correction section performing shading correction in the sub-lens, and
    the stitching section joins the image pieces, subjected to at least one of the alignment adjustment and the shading correction, together to form the subject image.

5. An image processing apparatus, which performs a signal processing of an image signal obtained by imaging a subject image in an imaging section, comprising:
    a first resolution restoration section performing resolution restoration of an image piece based on lens characteristics of a sub-lens for each pixel block, the image piece being formed by the sub-lens corresponding to the pixel block, the pixel block being constituted of a plurality of pixel cells arranged in a form of an array in the imaging section;
    a stitching section which joins the image pieces, subjected to the resolution restoration by the first resolution restoration section, together to form the subject image; and
    a second resolution restoration section performing resolution restoration of the subject image formed by joining the image pieces together in the stitching section based on lens characteristics of a main lens and the lens characteristics of the sub-lens, the main lens through which light from a subject is taken into the imaging section.

6. The image processing apparatus according to claim 5 further comprising at least one of:
    an alignment adjustment section performing alignment adjustment for correcting a deviation in the image piece due to an individual difference of the sub-lens; and
    a shading correction section performing shading correction in the sub-lens, and
    the stitching section joins the image pieces, subjected to at least one of the alignment adjustment and the shading correction, together to form the subject image.

* * * * *